W. HAGERTY.
FIRE-PROOF SAFE.

No. 171,723. Patented Jan. 4, 1876.

Witnesses
James R. Hanna.
L. J. K. Rine

Inventor,
William Hagerty
By A. C. Johnston
his atty.

UNITED STATES PATENT OFFICE.

WILLIAM HAGERTY, OF MONONGAHELA CITY, PENNSYLVANIA, ASSIGNOR TO HIMSELF AND JOHN COREY, OF SAME PLACE.

IMPROVEMENT IN FIRE-PROOF SAFES.

Specification forming part of Letters Patent No. 171,723, dated January 4, 1876; application filed November 12, 1875.

*To all whom it may concern:*

Be it known that I, WILLIAM HAGERTY, of Monongahela City, in the county of Washington and State of Pennsylvania, have invented a new and useful Improvement in Fire-Proof Safes; and I do hereby declare that the following is a full and exact description thereof, reference being had to the accompanying drawings and to the letters of reference marked thereon.

My invention relates to an improvement in fire-proof safes; and consists in constructing them in the usual form, but furnishing them with an outer and inner chamber for water, provided with inlet and outlet pipes, and communicating with each other and with double doors having water-chambers, as hereinafter specified, the whole being so constructed that the several compartments or chambers for the water may be readily filled with water, in case of fire, through the medium of water-main or other supply communicating with the inner water-chamber of the safe, whereby the colder water will be in the inner chamber, thus affording great protection to articles within the safe.

To enable others skilled in the art to make and use my invention I will proceed to describe its construction and operation.

Figure 1:
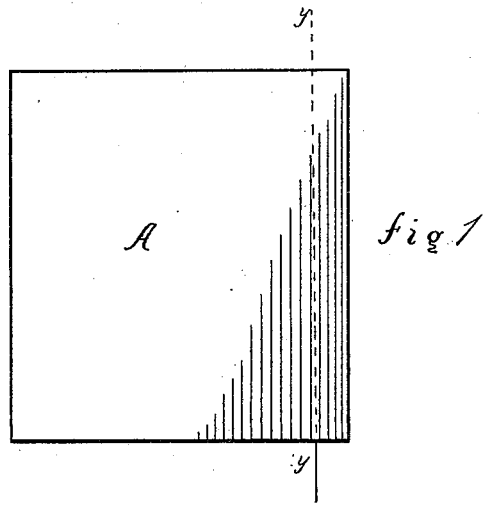
Figure 2:
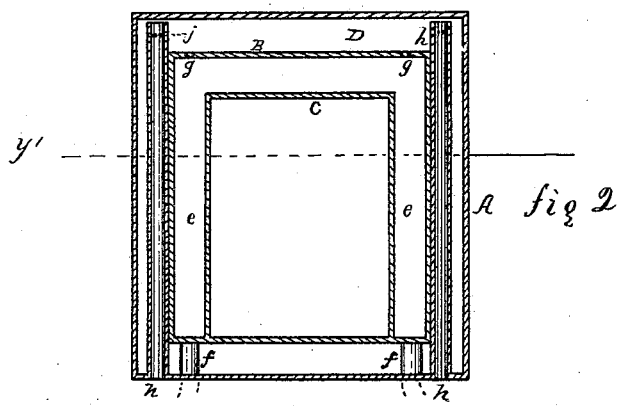
Figure 3:
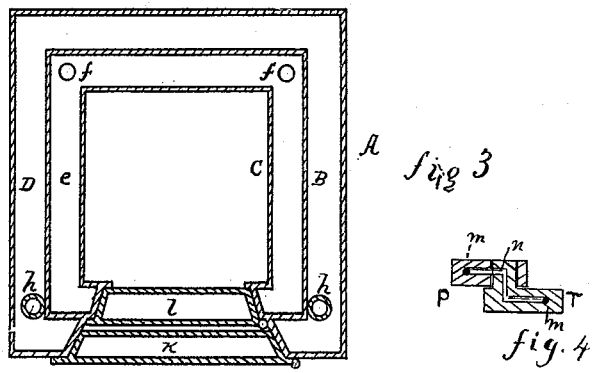

In the accompanying drawings, which form part of my specification, Figure 1 is a side elevation of a fire-proof safe. Fig. 2 is a vertical section of the same at line $y$ of Fig. 1. Fig. 3 is a transverse section of the same at line $y'$ of Fig. 2.

In the drawings, A represents the outer walls of the safe. B represents the middle walls. C represents the inner walls. Between the walls A, B, and C are spaces D $e$, forming water-chambers. The chamber $e$, between the walls B and C, are supplied with water through openings $f$, which, by means of pipe or pipes, communicate with a water-main or other water-supply. In the top wall of the chamber $e$ are openings $g$, through which water from chamber $e$ flows into the chamber D, formed by the walls A and B. In the chamber D are arranged pipes $h$, the upper ends of which do not quite reach to the under side of the top wall of the safe, so that the water flowing into the chamber D, after it is full, may run over and into the pipes $h$ and be carried off.

The pipes $h$ may be provided with a number of small openings, $j$, near their upper end, so that, in case of the upper wall sinking down and closing the ends of the pipes, the water will flow through the small openings $j$ and out through the pipes $h$.

The doors $k$ and $l$ are hollow, and their hinges are so constructed that the water in the chambers D and $e$ will flow through the pintles of the hinges and communicate with the interior of the doors, so that the water flowing through the pintles of the lower hinges will pass out, after the doors are filled, through the upper pintle of the hinges, thereby keeping up a complete circulation of water through the doors.

Figure 4:
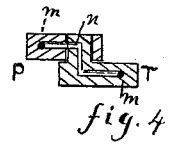

Fig. 4, in an enlarged view, illustrates one way in which this may be accomplished, $p$ $r$ representing the two parts of the hinge, and $m$ $m$ the openings of the water-channel $n$; but to this I make no claim.

The water flowing into the chamber $e$ will fill it, and then flow from it into chamber D, which, when full, will flow out through pipes $h$, thereby keeping up a complete circulation of the water through the chambers D and $e$, the colder water always being in the inner chamber $e$.

The hollow spaces in the doors $k$ and $l$, communicating with the chambers D and $e$, as before described, will keep up the circulation of water in them.

The pipe or pipes which communicate with the openings $f$, leading to the chamber $e$, should be furnished with a suitable valve arranged at some point outside of the building in which the safe is placed, so that, in case of fire, the water may be turned on for the purpose of flooding, and keeping a constant flow of water through the several chambers and doors hereinbefore described, thereby making the safe perfectly fire-proof—a desideratum long desired.

Having thus described my improvement, what I claim as of my invention is—

A safe constructed with inner and outer water-chambers $e$ D, respectively provided with inlet and outlet pipes $f$ $h$, said chambers communicating with each other and with the doors $l$ $k$, substantially as shown and described, and for the purpose specified.

WM. HAGERTY.

Witnesses:
JNO. HOLLAND,
JOHN STACKER.